Dec. 28, 1965   R. H. WHITEHEAD   3,225,616
GEAR CONSTRUCTION
Filed May 18, 1964   2 Sheets-Sheet 1
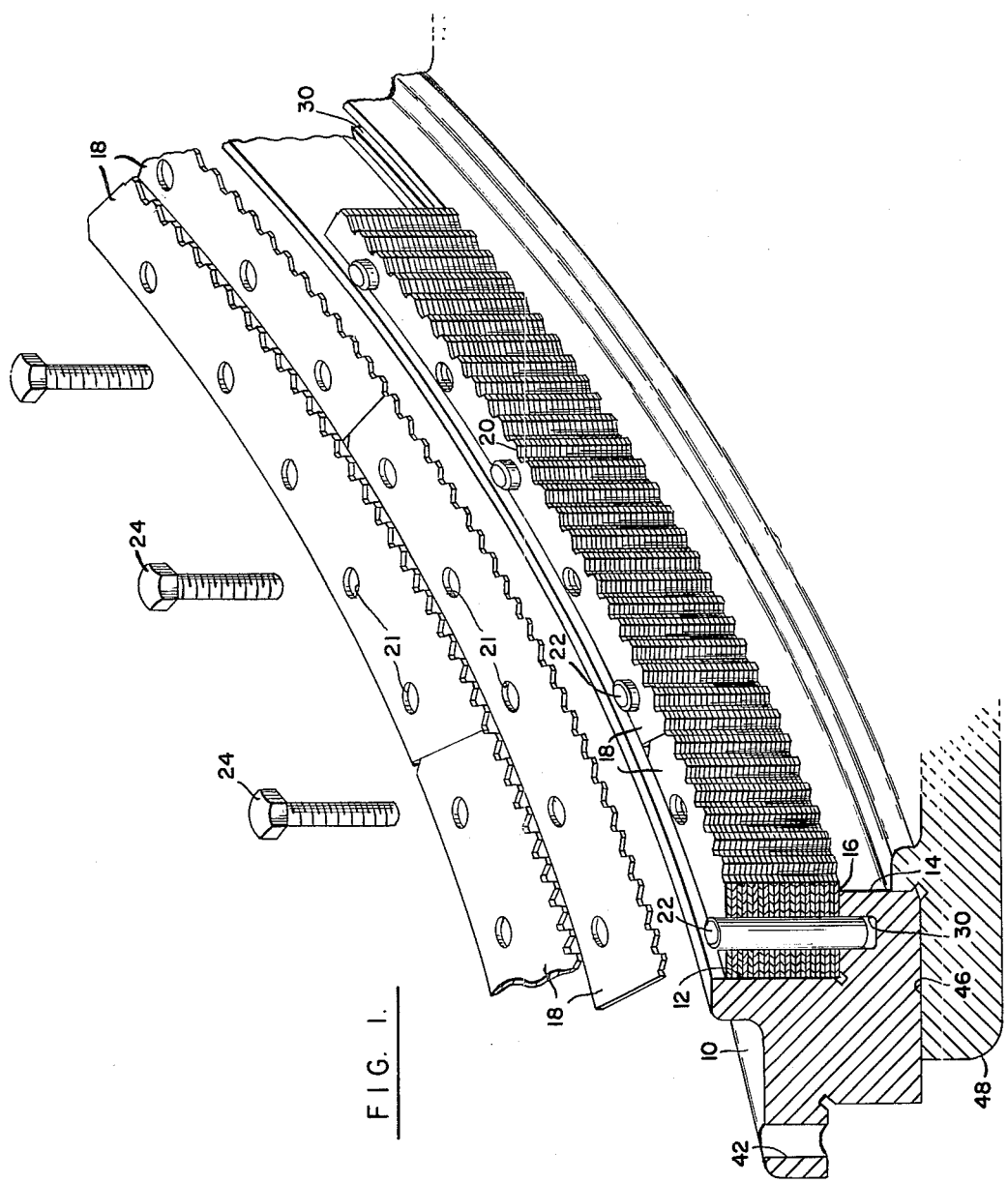
INVENTOR.
RICHARD H. WHITEHEAD
BY
ATTORNEYS

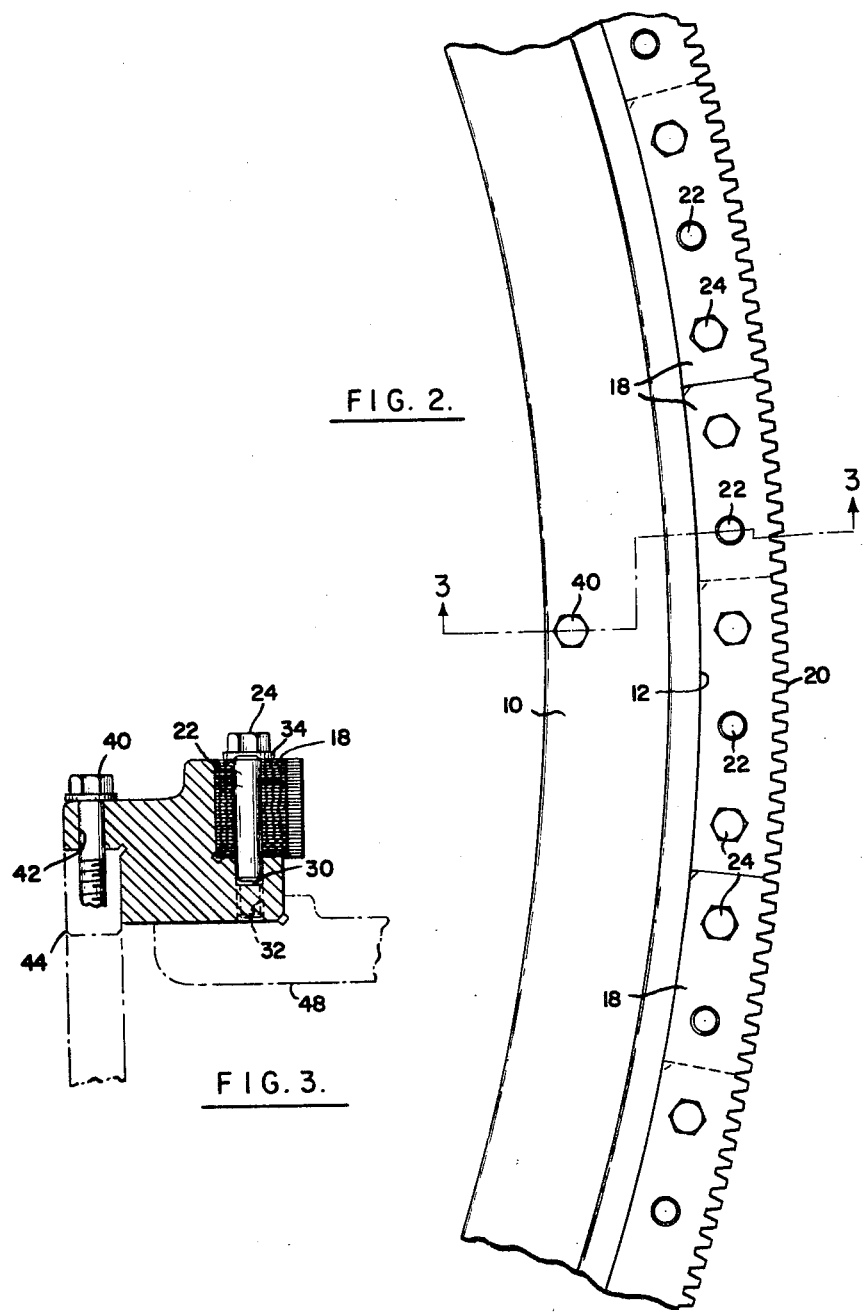

United States Patent Office 3,225,616
Patented Dec. 28, 1965

3,225,616
GEAR CONSTRUCTION
Richard H. Whitehead, Laconia, N.H., assignor to Scott & Williams, Incorporated, Laconia, N.H., a corporation of Massachusetts
Filed May 18, 1964, Ser. No. 368,239
7 Claims. (Cl. 74—449)

The present invention relates to a gear construction comprising an assembly of laminated segments.

It is an object of the present invention to provide a laminated gear construction which can be assembled from a plurality of segments which have been preformed by means of stamping or other suitable manufacturing techniques. In accordance with the present invention, the gear segments are of uniform construction and have the gear teeth formed therein. These segments are secured in a laminated, staggered overlapping arrangement on a rim to provide a gear of any desired diameter and number of teeth. This construction avoids the need for any gear teeth cutting operation.

The gear construction in accordance with this invention is particularly suitable for the making of large diameter gears. Large diameter gears are dificult and expensive to make by conventional gear cutting techniques because the necessary gear cutting machines for making large gears must be of a special construction and the manufacturing procedure must involve great accuracy and care.

The above and other objects and features of the invention will become apparent from a consideration of the following description in conjunction with the accompanying drawings, in which:

FIGURE 1 is a perspective view of a portion of a laminated and segmented gear in accordance with this invention; and FIGURE 2 is a plan view of a portion of a modified form of laminated and segmented gear in accordance with this invention; and FIGURE 3 is a section taken on line 3—3 of FIGURE 2.

Referring to the drawings, the gear in accordance with this invention comprises a ring 10 having an outer rim formed by a pair of axially extending circular walls 12 and 14 joined by an annular radially extending wall 16. Walls 12 and 14 are concentric with respect to the same axis, wall 14 having a larger diameter than wall 12. The projecting portion of ring 10 defined by walls 14 and 16 provides a flange-like portion for use in mounting a plurality of segments 18 on the ring 10 as best shown in FIGURES 1 and 3.

The segments 18 are all of uniform shape and consist of an arc-shaped strip the outer rim of which has gear teeth 20 formed thereon and the inner rim of which conforms to the shape of wall 12. The wall 12 serves as a radial positioning wall for the segments 18.

The segments 18 are formed of relatively thin metallic stampings, as for example $\frac{1}{16}$ of an inch in thickness. Each segment 18 may be formed by a simple stamping or punching operation in which the teeth 20 as well as the other portions are formed. There is no need to perform any machining operations in the forming of the gear teeth 20. Of course, the segments may be made of any material consistent with the use of the gear.

Each segment 18 is provided with five holes 21 spaced along the length thereof. The holes 21 are adapted to receive locking dowel pins 22 and clamping screws 24 which are used for mounting the segments on the ring 10. The spacing between each of the holes 21 is the same. Moreover, the spacing between each end of the segment and the hole adjacent thereto is one-half the spacing between adjacent holes in the segment. Accordingly, when two segments are placed in end-to-end relation, the spacing between the adjacent end holes of the two segments is the same as the spacing between the holes in the medial portion of the segment.

The projecting flange portion of the ring 10 is provided with an annular groove 30 in wall 16 concentric with the walls 12 and 14 and adapted to receive the dowel pins 22 and the clamping screws 24. A plurality of circumferentially spaced, threaded bores 32 extend from the base of the annular groove 30 in an axial direction into the projecting rim portion and are adapted for threaded engagement with the clamping screws 24. In the form of the invention shown in FIGURE 1, the threaded bores 32 are spaced to be in alignment with every other opening 21 in the end-to-end segments. In the form of the invention shown in FIGURE 2, the threaded bores 32 are spaced to be in alignment with the segment openings and so that each segment 18 will be positioned by three clamping screws 24 and two dowel pins 22. It will be apparent that various arrangements of the clamping screws and dowel pins may be used and that the arrangements shown in FIGURES 1 and 2 are for illustrative purposes.

The segments 18 are assembled on the ring 10 in an overlapping, end-to-end relationship as is best shown in FIGURE 1 to provide a laminated construction. Each layer of the segments 18 is placed over the dowel pins 22 and extends in end-to-end relationship around the circumference of the gear. Alternate layers are staggered as is best shown in FIGURE 1 with the ends of the segments 18 being circumferentially overlapped in the alternate layers. It will be apparent that the segments 18 are dimensioned so that they form a continuous ring about the circumference of the gear. After all of the segments 18 have been positioned on the dowel pins 22 and all of the layers are completed, the clamping screws 24 are inserted in the remaining openings provided by the segments and are threaded into the threaded bores 32 so as to clamp the segments 18 between the wall 16 and washers 34 which are provided for each clamping screw. It will be noted that the segments 18 are wider than the wall 16 so that the gear teeth 20 project beyond the rim wall 14.

The ring 10 is mounted on a suitable hub portion by means of a plurality of mounting bolts 40 extending through holes 42 in the ring 10 and threadedly engaging a suitable hub connecting member 44. The ring 10 may be mounted for movement in a suitable circular guideway 46 provided by a member 48 which supports the ring 10 as is best shown in FIGURE 1.

It will be apparent that various size gears may be constructed in accordance with the laminated segmental construction in accordance with this invention. The size of the segments and the construction thereof will, of course, depend on the characteristics of the gear to be constructed. By way of example, a gear having a pitch diameter of 70 inches, a diametral pitch of 10, and 700 teeth can be constructed in accordance with this invention by the use of segments having 25 teeth with 28 segments to complete a single lamination. Moreover, the segments may be made of $\frac{1}{16}$ inch stampings with 24 laminations comprising the complete gear whereby the breadth of the teeth is 1½ inches.

It will be apparent that the gear construction in accordance with this invention may be used for the manufacture of gears of very large diameters. Moreover, this gear may be made without any machining operation for forming the gear teeth. Instead, each of the segments which is assembled to form the gear can be made of stampings which have the gear teeth formed thereon.

It will be evident that various changes can be made in the construction and arrangement of parts without departing from the scope of the invention. For example, the invention is applicable for gears having internal teeth as well as gears having external teeth. It is, therefore, to be understood that the invention described herein is not to be construed as limiting except as required by the following claims.

What is claimed is:

1. A gear comprising means providing a ring, a plurality of preformed arcuate segments having gear teeth of the same shape formed thereon, and means mounting said segments on a rim of said ring in a plurality of layers, each of said layers comprising a plurality of said segments arranged in end-to-end relationship, the segments in each layer being mounted with the gear teeth thereof coinciding with the teeth of the other layers, said segments being preformed in entirety including the teeth thereof prior the assembling thereof to form the gear, and segments in adjacent layers being arranged in staggered overlapping relation.

2. A gear comprising a ring, a plurality of relatively thin, uniform, arcuate segments having gear teeth formed thereon, the thickness of said segments being such that said segments may be preformed with said gear teeth by blanking them out from flat stock, and means mounting said segments on a rim of said ring in a plurality of layers, each of said layers comprising a plurality of said segments arranged in end-to-end relationship, the segments in each layer being mounted with the gear teeth thereof coinciding with the teeth of the other layers, and segments in adjacent layers being arranged in staggered overlapping relation.

3. A gear comprising a ring the outer rim of said ring having an outwardly projecting annular flange, a plurality of relatively thin uniform arcuate segments having gear teeth formed thereon, the thickness of said segments being such that said segments may be preformed with said gear teeth by blanking them out from flat stock, said segments having holes therein, means mounting said segments on the outer rim of said ring in a plurality of layers, said mounting means including a plurality of clamping screws threadedly engaging said flange and extending through said holes in said segments, each of said layers comprising a plurality of said segments arranged in end-to-end relationship, the segments in each layer being mounted with the gear teeth thereof coinciding with the teeth of the other layers, and segments in adjacent layers being arranged in staggered overlapping relation.

4. A gear comprising a ring the outer rim of said ring having an outwardly projecting annular flange, a plurality of relatively thin, uniform, arcuate, blanked out segments having gear teeth formed thereon by blanking, each of said segments having a plurality of holes therein spaced along the length thereof, means mounting said segments on the outer rim of said ring in a plurality of layers, said mounting means including a plurality of clamping screws threadedly engaging said flange and extending through some of said holes in said segments, and a plurality of dowel pins mounted in said flange and extending through others of said holes in said segments, each of said layers comprising a plurality of said segments arranged in end-to-end relationship, the segments in each layer being mounted with the gear teeth coinciding with the teeth of the other layers, and segments in adjacent layers being arranged in staggered overlapping relation.

5. A gear comprising a ring the outer rim of said ring having an outwardly projecting annular flange, a plurality of relatively thin, uniform, arcuate, blanked out segments having gear teeth formed thereon when blanked, said segments having holes therein, means mounting said segments on the outer rim of said ring in a plurality of layers, said mounting means including a plurality of clamping screws threadedly engaging said flange and extending through said holes in said segments, said screws being mounted to clamp said segments onto said flange, each of said layers comprising a plurality of said segments arranged in end-to-end relationship, the segments in each layer being mounted with the gear teeth thereof coinciding with the teeth of the other layers, and segments in adjacent layers being arranged in staggered overlapping relation.

6. A gear according to claim 4 wherein said annular flange is mounted in a horizontal position with its upper face extending in a substantially horizontal plane, said segments on said upper face, said screws and said dowel pins extending vertically from said upper face, and including an annular recess extending downwardly from said upper face receiving the lower ends of said dowel pins.

7. The method of constructing a relatively large gear comprising the steps of blanking out from relatively thin flat stock a plurality of uniform arcuate segments having gear teeth of the same shape formed thereon during said blanking out thereof, mounting said preformed segments on the rim of a ring in a plurality of layers, each of said layers comprising a plurality of segments arranged in end-to-end relationship, the segments in each layer being mounted with the gear teeth thereof coinciding with the teeth of the other layers, and segments in adjacent layers being arranged in staggered overlapping relation, there being a sufficient number of said segments to provide a completed ring in each layer.

References Cited by the Examiner

UNITED STATES PATENTS

| | | | |
|---|---|---|---|
| 462,994 | 11/1891 | Pfetch | 74—445 X |
| 975,743 | 11/1910 | Bloomfield | 74—448 |
| 1,141,097 | 6/1915 | Alquist | 74—445 X |

DON A. WAITE, *Primary Examiner.*